UNITED STATES PATENT OFFICE.

BENJAMIN F. ARTHUR, OF HOLYOKE, MASSACHUSETTS.

PROCESS OF CLEANING SILVER.

SPECIFICATION forming part of Letters Patent No. 674,254, dated May 14, 1901.

Application filed February 9, 1900. Serial No. 4,661. (No specimens.)

*To all whom it may concern:*

Be it known that I, BENJAMIN FRANK ARTHUR, a citizen of the United States, residing at Holyoke, in the county of Hampden and State of Massachusetts, have invented new and useful Improvements in Processes for Cleansing the Surface of Silver, of which the following is a specification.

The invention relates especially to the removal of the discoloring oxids from the metal silver without abrasion and without the use of acids, which might dissolve the metal.

My improved process consists in making an alkaline mixture which under certain conditions of temperature will attack the said oxids and leave the surface of the metal clean and brilliant.

The cleaning mixture is compounded by mixing carbonate of soda and carbonate of calcium in the proportion of eleven parts, by weight, of calcium to one part of soda and to each ounce of this mixture adding two quarts of water. In carrying out this process as much of the mixture containing the relative proportions of the carbonates of calcium and soda and water above stated is heated in a proper receptacle, and the silver articles to be cleansed are then immersed therein. The degree of heat required to produce the required cleansing effect of the mixture on oxidized silver articles must be at least 212° Fahrenheit or over. The temperature indicated is not required to facilitate the working of the mixture or to accelerate it, but it is an absolute necessity to its operation, and the mixture is totally inoperative if used cold and practically inoperative if used at a temperature below the boiling-point, though an excess of temperature above this point does not produce any unfavorable action thereon. When articles of silver which have become oxidized are immersed in this mixture under the conditions set forth, the mixture acts as a solvent for said oxids and the articles when withdrawn are restored to their natural whiteness, and after they are dry a very thin coating of the calcium and soda carbonates remains thereon, which may be wiped off with a soft cloth, exposing the original luster of the silver. No rubbing is required. The removal of the oxidation is effected through the action of the alkalies in the presence of the required heat.

By means of this process silver articles which are very highly polished may be quickly and thoroughly cleansed if discolored by oxidation without marring the brilliant surface thereof by any of the fine hair-line scratches which result from the use of many of the so-called "polishes" in which the active agent is an abradant.

All statements made herein as to the properties or characteristics of the cleansing process described herein are susceptible of actual demonstration.

Having thus described my invention, what I claim as new is—

1. The herein-described process of removing discoloration from silver, due to oxidation, which consists in immersing said articles in a mixture of water, carbonate of soda and carbonate of calcium, heated to a temperature of not less than 212° Fahrenheit.

2. The herein-described process for cleaning the surface of silver articles without abrasion, which consists in immersing said articles in a mixture heated to 210° Fahrenheit or over, consisting of water, carbonate of calcium, and carbonate of soda in substantially the proportions specified.

In testimony whereof I have signed my name to this specification in the presence of two subscribing witnesses.

BENJAMIN F. ARTHUR.

Witnesses:
 WM. H. CHAPIN,
 K. I. CLEMONS.